UNITED STATES PATENT OFFICE.

BENJAMIN GARVEY, OF NEW YORK, N. Y.

IMPROVEMENT IN THE MANUFACTURE OF BREAD.

Specification forming part of Letters Patent No. 29,158, dated July 17, 1860.

*To all whom it may concern:*

Be it known that I, BENJAMIN GARVEY, of the city, county, and State of New York, have invented a new and useful Method of Making Bread, Cake, Confectionery, &c.; and I do hereby declare the following to be a full, clear, and exact description of the same.

The nature of my invention consists in removing the atmospheric pressure, when the materials have been mixed, to such a degree that the air diffused through the mass shall, in virtue of the elastic force inherent in it, expand and produce the requisite raising or lightness.

To enable others skilled in the arts to use my invention, I describe it as follows:

I do not use any kind of apparatus nor any composition of matter which is not well known and in common use. I mix the material usually employed for making bread, cake, or confectionery respectively in the usual proportions and with the customary manipulations, except that I generally omit all ferments and baking-powders, the object of which is to diffuse carbonic-acid gas through the mass. Having prepared the dough, paste, or batter, &c., in the manner described, and having divided the same into suitable portions and molded these into loaves, cakes, &c., I put them, one or several at the same time, into an air-tight vessel or into an air-tight oven, from which I then exhaust the air by any of the usual means employed for that purpose, so that the air diffused throughout the mass expands and raises or lightens the bread, &c., either before the latter is put to bake or during the process of baking.

To produce hard or dense bread I mix the materials in an exhausted vessel and do the baking where the bread has the full atmospheric pressure upon it.

I do not claim the employment of carbonic acid or any gas other than atmospheric air, by compression or otherwise, to aerate or raise bread; but

What I claim as my invention, and desire to secure by Letters Patent, is as follows:

1. The process herein described of employing atmospheric air by exhaustion to produce lightness in bread, cake, confectionery, &c., without the aid of ferments, chemicals, or drugs of any kind.

2. The same process to insure the raising of bread, &c., under all circumstances when ferments or chemicals are employed.

BENJAMIN GARVEY. [L. S.]

Witnesses:
WM. H. VAN VOORHIS,
GEO. W. BANTA, Jr.